United States Patent
Saso et al.

(10) Patent No.: US 10,361,639 B1
(45) Date of Patent: Jul. 23, 2019

(54) POWER SUPPLY APPARATUS

(71) Applicant: Sansha Electric Manufacturing Co., Ltd., Osaka-shi, Osaka (JP)

(72) Inventors: Hiroshi Saso, Osaka (JP); Takeshi Morimoto, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 0 days.

(21) Appl. No.: 16/025,396

(22) Filed: Jul. 2, 2018

(30) Foreign Application Priority Data

Feb. 20, 2018 (JP) .................................. 2018-27550

(51) Int. Cl.
| | |
|---|---|
| H02M 7/44 | (2006.01) |
| B23K 10/00 | (2006.01) |
| H02M 7/10 | (2006.01) |
| H02M 3/158 | (2006.01) |
| H02M 7/02 | (2006.01) |
| H02M 7/08 | (2006.01) |
| H02M 1/00 | (2006.01) |
| H02M 7/48 | (2007.01) |

(52) U.S. Cl.
CPC ............ *H02M 7/44* (2013.01); *B23K 10/006* (2013.01); *H02M 7/02* (2013.01); *H02M 7/08* (2013.01); *H02M 7/10* (2013.01); *H02M 2001/0058* (2013.01); *H02M 2003/1586* (2013.01); *H02M 2007/4811* (2013.01)

(58) Field of Classification Search
CPC ........... H02M 7/44; H02M 2007/4811; H02M 2003/1586; H02M 3/28; H02M 2001/0058; H02M 7/02; H02M 7/08; H02M 7/10; B23K 10/006; B23K 10/02
See application file for complete search history.

(56) References Cited

U.S. PATENT DOCUMENTS

| | | | | | |
|---|---|---|---|---|---|
| 5,771,163 | A | * | 6/1998 | Moriguchi | ............ H02M 3/285 363/25 |
| 5,930,122 | A | * | 7/1999 | Moriguchi | .............. H02M 1/10 363/17 |
| 6,091,049 | A | * | 7/2000 | Ikeda | .................. B23K 9/0953 219/130.21 |

(Continued)

FOREIGN PATENT DOCUMENTS

JP 4758234 B2 8/2011

*Primary Examiner* — Nguyen Tran
*Assistant Examiner* — Demetries A Gibson
(74) *Attorney, Agent, or Firm* — Duane Morris LLP

(57) ABSTRACT

A main unit 2 and a subsidiary unit 4 include two inverters 6m, 8m and 6s, 8s, and PWM control circuits 26m, 26s, respectively. A changeover switch 20 operates to simultaneously connect the inputs of the two inverters of the main unit 2 and the inputs of the two inverters of the subsidiary unit 4 in series or in parallel. An imbalance detecting circuit 28 detects imbalance in the input voltages to the two inverters of the main unit 2, and provides the detection result to the PWM control circuits 26m and 26s. The PWM control circuit 26m controls the inverters 6m and 8m of the main unit 2 in accordance with the detection result supplied from the imbalance detecting circuit 26m, and the PWM control circuit 26s controls the subsidiary unit 4 in accordance with the detection result supplied from the imbalance detecting circuit 26m. The input current to the main unit 2 is larger than the input current to the subsidiary unit 4.

5 Claims, 2 Drawing Sheets

(56) References Cited

U.S. PATENT DOCUMENTS

| | | | | |
|---|---|---|---|---|
| 6,269,015 B1 * | 7/2001 | Ikeda | ............ | B23K 9/091 |
| | | | | 219/130.21 |
| 6,549,441 B1 * | 4/2003 | Aigner | ............ | B23K 9/095 |
| | | | | 219/130.21 |
| 7,339,807 B2 | 3/2008 | Katooka et al. | | |
| 2004/0037092 A1 * | 2/2004 | Kurio | ............ | H02M 3/3376 |
| | | | | 363/17 |
| 2004/0246755 A1 * | 12/2004 | Isii | ............ | H02M 1/10 |
| | | | | 363/131 |
| 2007/0165433 A1 * | 7/2007 | Katooka | ............ | H02M 1/10 |
| | | | | 363/142 |
| 2016/0301305 A1 * | 10/2016 | Yamada | ............ | H02M 3/156 |

\* cited by examiner

POWER SUPPLY APPARATUS

TECHNICAL FIELD

This invention relates to a power supply apparatus and, more particularly, to a power supply apparatus which is supplied with one of two selectable voltages of different magnitudes and operates in a manner suitable for the selected supply voltage.

BACKGROUND ART

An example of the above-stated type of power supply apparatus is disclosed in Japanese Patent No. 4758234 B. The power supply apparatus of Japanese Patent No. 4758234 B is arranged to be supplied with a selected one of commercial AC voltages of, for example, 200 V and 400 V. The power supply apparatus includes two inverters. When the voltage of larger value, 400 V, is supplied to the power supply apparatus, a DC voltage resulting from conversion of the supplied 400 V AC voltage is applied to a series connection of the two inverters, and, when the voltage of smaller value, 200 V, is supplied, a DC voltage resulting from conversion of the supplied 200 V AC voltage is applied to a parallel connection of the two inverters. Like this, depending on the magnitude of the voltage supplied to the power supply apparatus, the two inverters are connected in an appropriate one of series and parallel connections.

SUMMARY OF INVENTION

Power supply apparatuses like the one described above may be used as a power supply apparatus for a plasma welding machine or a power supply apparatus for a plasma cutting machine, for example. Some plasma welding machine or plasma cutting machine power supply apparatuses have a main unit for supplying electric power to a load and, in addition, a subsidiary unit for generating a pilot arc. When the technique described in Japanese Patent No. 4758234B is applied to such power supply apparatus with main and subsidiary units, each of the two units must have two inverters.

When the two inverters are connected in series in each of the main and subsidiary units, there will be difference in power consumption between the two inverters due to, for example, difference in characteristics of driver circuits of the two inverters or changes in load, causing imbalance in voltage borne by the two inverters. One might consider detecting imbalance in voltage borne by the two inverters in each of the main and subsidiary units by means of imbalance detecting means and controlling the two inverters so as to compensate for the imbalance.

However, to provide imbalance detecting means in each of the main and subsidiary units will make the circuit arrangement complicated and increase the number of circuit components to be used, which would result in increase of the cost of the apparatus.

An object of the present invention is to provide such power supply apparatus, which includes main and subsidiary units of which respective two inverters are selectively connected in series or in parallel simultaneously. The power supply apparatus according to the present invention employs a simple circuit arrangement to thereby reduce the number of circuit components, resulting in reduction of manufacturing costs, while eliminating imbalance in voltage borne by the respective inverters of each unit, which imbalance could otherwise occur when the two inverters of each unit are connected in series.

A power supply apparatus according to one embodiment of the present invention can be used with a plasma cutting machine or a welding machine, for example. The power supply apparatus includes a main unit and a subsidiary unit. Each of the main and subsidiary units includes two inverters and control means for controlling the two inverters. The outputs of the two inverters of each of the main and subsidiary units are converted into DC, combined together and provided as the output of each unit. The main unit may be used for a load and the subsidiary unit may be used to generate a pilot arc. The inputs of the two inverters of each of the main and subsidiary units are connected in selected one of series and parallel connections by switching means, or a changeover switch, for example. Let it be assumed that a voltage to be applied to the main and subsidiary units is a selected one of, for example, two voltages, e.g. first and second voltages, and that the first voltage is higher than the second voltage. When the higher, first voltage is applied, the two inverters of each of the two units are connected in series. When the lower, second voltage is applied, the two inverters of each of the two units are connected in parallel. With the two inverters of each of the two units connected in series, imbalance detecting means, e.g. an imbalance detector, detects imbalance of the input voltages to the two inverters of the main unit, for example. The imbalance detecting means provides the result of the imbalance detection to the control means of both of the main and subsidiary units, respectively, so that the control means of the main unit can control the two inverters of the main unit so as to remove the voltage imbalance in the main unit and that the control means of the subsidiary unit can control the two inverters of the subsidiary unit so as to remove the voltage imbalance in the subsidiary unit. In the power supply apparatus being discussed, the input current to the main unit is larger than the input current to the subsidiary unit. In other words, the input current flowing into the subsidiary unit is smaller than the input current flowing into the main unit.

In the power supply apparatus configured as stated above, in the main unit, imbalance between the input voltages to the two inverters of the main unit is detected by the imbalance detecting means. The result of the detection is supplied to the control means of both of the two units, whereby the control means of the main unit controls its own two inverters whereas the control means of the subsidiary unit controls its own two inverters. Since the input current to the subsidiary unit is smaller than the input current to the main unit, the control of the two inverters of the subsidiary unit according to the result of detection of the imbalance in the main unit can adequately correct the imbalance in the subsidiary unit. Thus, the imbalance detecting means required is only the one used for the main unit, and, therefore, the circuit arrangement can be simplified, resulting in reduction of the number of components required. In this way, the imbalance can be eliminated at low cost. Imbalance between the two inverters of the subsidiary unit can be corrected with high accuracy by employing an input current to the main unit five or more times as large as the input current to the subsidiary unit.

In the described arrangement, the main and subsidiary units may use switching means in common. The switching means may be automatically switched in response to changes of detected supplied voltage or may be manually switched by an operator. The use of the switching means in common for the main and subsidiary units can simplify the circuit arrangement.

DESCRIPTION OF EMBODIMENTS

Figure 1:
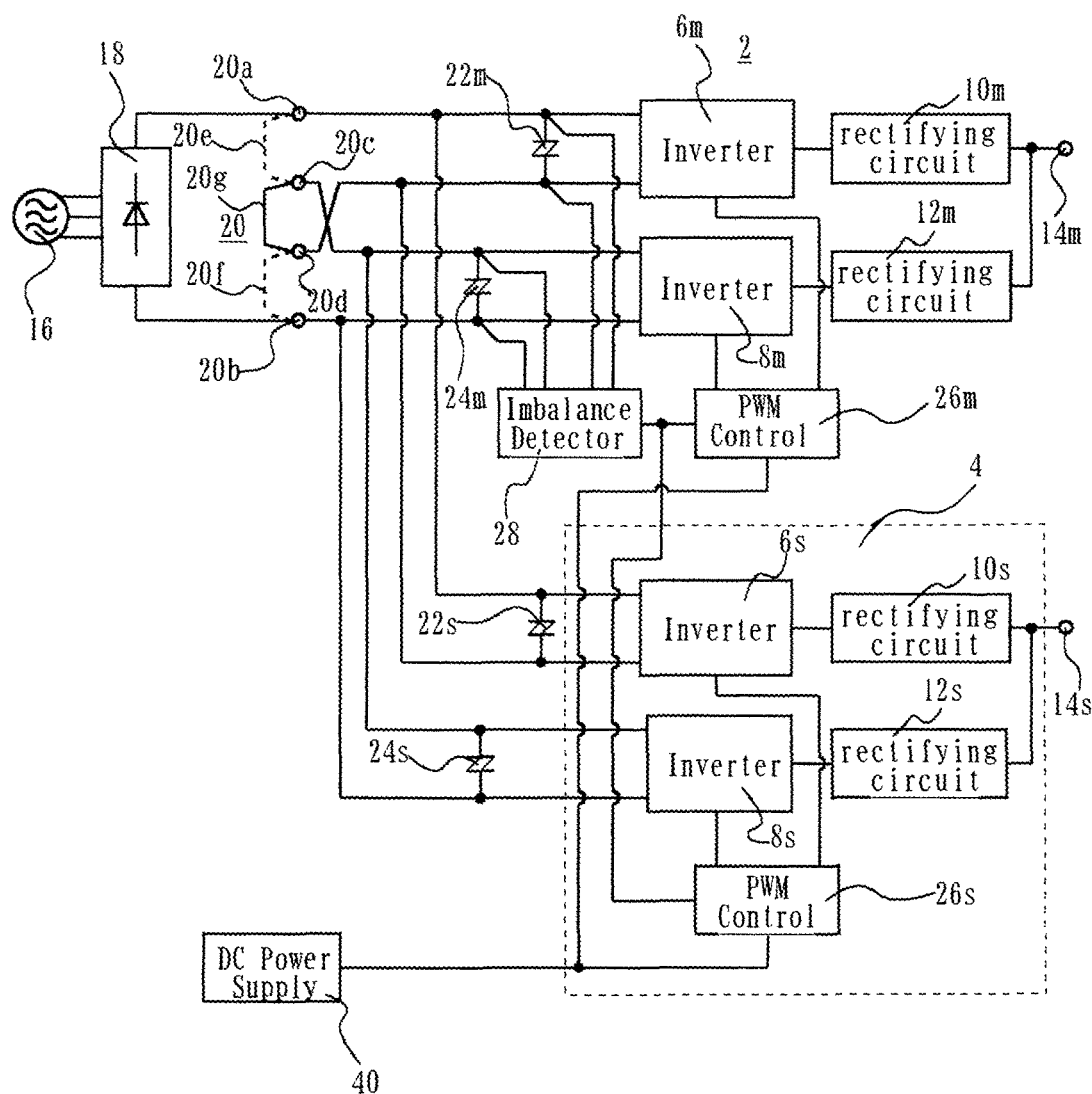
FIG. 1 is a block diagram of a power supply apparatus according to an embodiment of the present invention.

A power supply apparatus according to one embodiment of the present invention may be used with a plasma welding machine and a plasma cutting machine, for example. As shown in FIG. 1, the power supply apparatus has a main unit 2 for supplying power to a plasma load, for example, and a subsidiary unit 4 for generating a plasma arc, for example. The main and subsidiary units 2 and 4 of the power supply apparatus being described are arranged to be operable from either one of two commercial AC voltages having different values, e.g. 100 V and 200 V commercial AC voltages.

The main unit 2 includes two inverters 6m and 8m which convert DC voltage applied thereto into AC voltages and output the resultant AC voltages. The inverters 6m and 8m have the same output capacity. The outputs of the inverters 6m and 8m are converted into DC by rectifying means, for example, rectifying circuits 10m and 12m, respectively, and combined into one output. The combined output is developed at an output terminal 14m. In order for the main unit 2 to be operable from either one of 100 V and 200 V commercial AC power supplies, as mentioned above, inputs of the inverters 6m and 8m are connected in parallel when a voltage obtained by converting the voltage from a 100 V commercial AC power supply into DC form is applied thereto, and are connected in series when a voltage obtained by converting the voltage from a 200 V commercial AC power supply into DC form is applied thereto, as described later.

Like the main unit 2, the subsidiary unit 4 includes inverters 6s and 8s, rectifying circuits 10s and 12s, and an output terminal 14s. It should be noted, however, that, since the inverters 6s and 8s, though they have the same performance as the inverters 6m and 8m, are used to generate a plasma arc, their output capacities are smaller than those of the inverters 6m and 8m. Further, the current supplied to the inverters 6s and 8s is smaller than the current supplied to the inverters 6m and 8m, or smaller than or one-fifth maximum, for example, as large as the current to the inverters 6m and 8m.

A voltage from a 100 V or 200 V commercial AC power supply 16 is rectified in a rectifying circuit 18, and the thus rectified voltage is applied to the inverters 6m and 8m of the main unit 2 and to the inverters 6s and 8s of the subsidiary unit 4. For that purpose, switching means, e.g. a changeover switch, or more specifically a manual changeover switch 20, is disposed between the output of the rectifying circuit 18, on one hand, and the inputs of the inverters 6m, 8m, 6s and 8s, on the other hand. The changeover switch 20 has contacts 20a and 20b connected to respective ones of two outputs of the rectifying circuit 18. There are provided two contacts 20c and 20d between the two contacts 20a and 20b. The contacts 20a and 20c are connected together by a contact shoe 20e (shown by a dotted line in FIG. 1). When the contacts 20a and 20c are connected by the contact shoe 20e, the contacts 20b and 20d are interconnected by a contact shoe 20f (shown by a dotted line). However, the contacts 20c and 20d remain unconnected. In other case, the contacts 20c and 20d are connected each other by a contact shoe 20g (shown by a solid line). When the contacts 20c and 20d are connected together, the contact shoe 20e does not connect the contacts 20a and 20c, and the contact shoe 20f does not connect the contacts 20d and 20b, either.

In the main unit 2, one and the other inputs of the inverter 6m are connected to the contacts 20a and 20d, respectively. One and the other inputs of the inverter 8m are respectively connected to the contacts 20c and 20b. Accordingly, in the state where the contacts 20a and 20c are connected by the contact shoe 20e and the contacts 20b and 20d are connected together by the contact shoe 20f, the inputs of the inverters 6m and 8m are connected in parallel between the two outputs of the rectifying circuit 18. On the other hand, when the contact shoe 20g connects the contacts 20c and 20d together, the input of the inverters 6m and 8m are connected in series between the two outputs of the rectifying circuit 18.

In the subsidiary unit 4, one and the other inputs of the inverter 6s are connected to the contacts 20a and 20d, respectively. One and the other inputs of the inverter 8s are connected to the contacts 20c and 20b, respectively. Accordingly, when the contact shoe 20e connects the contacts 20a and 20c together and the contacts 20b and 20d are connected to each other by the contact shoe 20f, the inputs of the inverters 6s and 8s are connected in parallel between the two outputs of the rectifying circuit 18. When the contacts 20c and 20d are connected by the contact shoe 20g, the inputs of the inverters 6s and 8s are connected in series between the two outputs of the rectifying circuit 18.

As described, the changeover switch 20 is used in the main and subsidiary units 2 and 4 in common. When the 100 V commercial power supply is used, the contact shoes 20e and 20f are used to connect the inputs of the inverters 6m and 8m of the main unit 2 in parallel between the two outputs of the rectifying circuit 18, and also connect the inputs of the inverters 6s and 8s of the subsidiary unit in parallel between the two outputs of the rectifying circuit 18. When the 200 V commercial power supply is used, the contact shoe 20g is used to connect the inputs of the inverters 6m and 8m of the main unit 2 between the two outputs of the rectifying circuit 18, and to connect the inputs of the inverters 6s and 8s of the subsidiary unit 4 between the two outputs of the rectifying circuit 18.

Smoothing capacitors 22m and 24m are connected between the inputs of the inverter 6m and between the inputs of the inverter 8m, respectively. Also, smoothing capacitors 22s and 24s are connected between the inputs of the inverter 6s and between the inputs of the inverter 8s, respectively. The smoothing capacitors 22m, 24m, 22s and 24s are for smoothing the output of the rectifying circuit 18 for application to the inverters 6m, 8m, 6s and 8s.

The inverters 6m and 8m of the main unit 2 are controlled by control means 26m, e.g. a PWM control circuit 26m, to output currents, for example, of a predetermined value at the outputs of the inverters 6m and 8m. The inverters 6s and 8s of the subsidiary unit 4 are similarly controlled by control means 26s, e.g. a PWM control circuit 26s.

When the inverters 6m and 8m of the main unit 2 are connected in series, with the inverters 6s and 8s of the subsidiary unit 4 connected also in series, it may sometimes happen that the voltages borne by the inverters 6m and 8m are not equal to each other due to, for example, difference in power consumption due to difference in characteristics between the inverters 6m and 8m, short-circuiting of a load, and variations of the load, or to characteristic difference caused by aging of the capacitors 22*m* and 24*m*. Imbalance detecting means 28, e.g. an imbalance detecting circuit 28, is used to detect imbalance in input voltage of the inverters 6*m* and 8*m*, or, in other words, imbalance of the voltages across the capacitors 22*m* and 24*m*. The imbalance detecting circuit 28 also detects the magnitude of the imbalance. The result of the imbalance detection is applied to the PWM control circuit 26*m*. The PWM control circuit 26*m* controls the inverters 6*m* and 8*m* in such a manner as to remove the imbalance.

According to conventional techniques, for the purpose of eliminating imbalance between the inverters 6*s* and 8*s* of the subsidiary unit 4, an imbalance detecting circuit like the imbalance detecting circuit 28 has to be provided for the inverters 6*s* and 8*s*, and the result of the detection has to be supplied to the PWM control circuit 26*s*. However, such arrangement makes the circuit arrangement of the power supply apparatus complicated as a whole, and increases the number of components to be used, resulting in increase of the cost of the power supply apparatus. The present invention is to solve this problem. According to the embodiment being described, the result of detection from the imbalance detecting circuit 28, which detects imbalance between the inverters 6*m* and 8*m* of the main unit 2, is supplied also to the PWM control circuit 26*s* of the subsidiary unit 4 to control the inverters 6*s* and 8*s* of the subsidiary unit 4. Since the subsidiary unit 4 is for use in generating a plasma arc and, therefore, its output is small relative to the output of the main unit 2, imbalance between the inverters 6*s* and 8*s* of the subsidiary unit 4 can be adequately compensated by controlling the inverters 4*s* and 6*s* in accordance with the result of imbalance detection in the main unit 2. Accordingly, it is not necessary to use another imbalance detecting circuit for the inverters 4*s* and 6*s* of the subsidiary unit 4, and, therefore, the circuit arrangement of the power supply apparatus can be simpler. In addition, the number of components required for the power supply apparatus can be reduced, resulting in reduction of the manufacturing cost of the power supply apparatus. Furthermore, according to the described embodiment, the changeover switch 20 is used in common for the main unit 2 and the subsidiary unit 4, which can prevent an operator, who is manually operating the changeover switch 20, from forgetting to switch the inverters of one of the main unit 2 and the subsidiary unit 4 from or to series connection to and from the parallel connection, whereby both of the units can be reliably switched to the proper connection for the voltage supplied thereto.

Although not shown, the output of the rectifying circuit 18 is supplied also to a DC power supply 40, which provides operating power to the PWM control circuits 26*m* and 26*s*.

In the described embodiment, a manually operated switch is used as the changeover switch 20, but the switch 20 is not limited to a manually operated switch. The voltage from the commercial AC power supply 16 or the rectifying circuit 18 may be detected, and the changeover switch 20 is operated in response to the result of detection. For example, it may be arranged that the output voltage of the commercial AC power supply is detected, and, when 100 V is detected, the changeover switch is arranged to automatically connect the two inverters of the main unit 2 in parallel and the two inverters in the subsidiary unit 4 also in parallel. On the other hand, if 200 V is detected, the changeover switch automatically connects the two inverters in each of the main and subsidiary units 2 and 4 in series.

Figure 2:
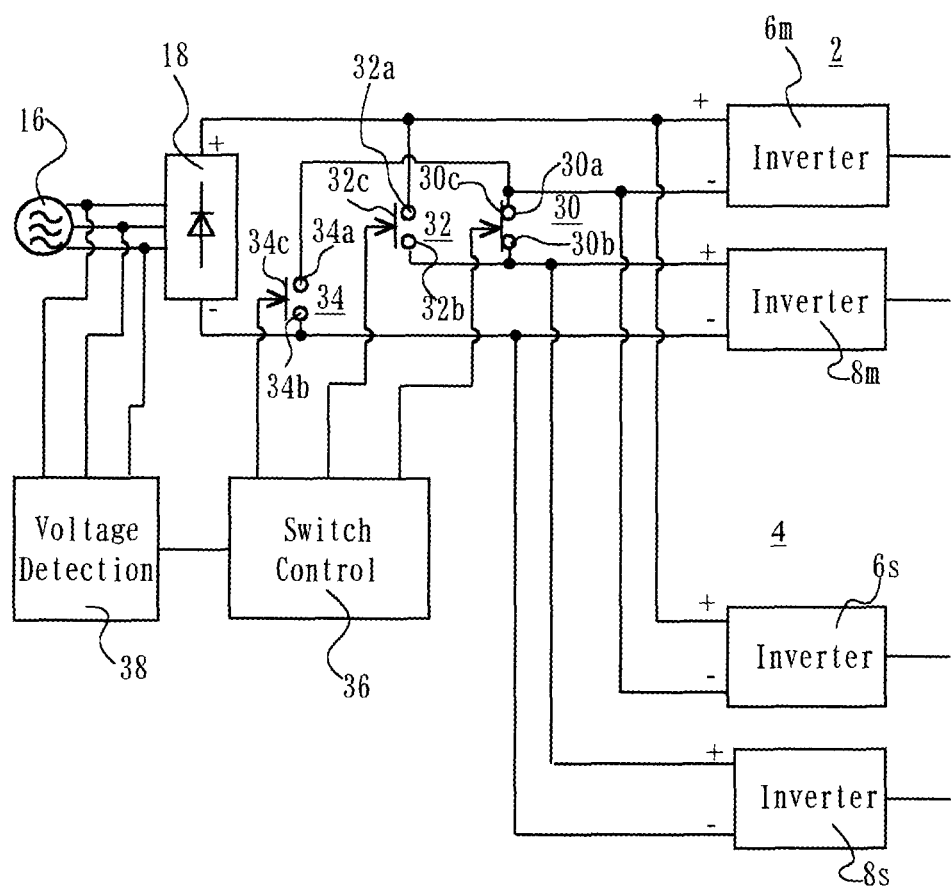
FIG. 2 is a block diagram of part of a modification of the power supply apparatus of FIG. 1.

This arrangement is described hereinafter. Specifically, as shown in FIG. 2, respective one (+) inputs of the inverters 6*m* and 6*s* are connected to one (+) output of the rectifying circuit 18, and respective one (−) inputs of the inverters 8*m* and 8*s* are connected to the other (−) output of the rectifying circuit 18. The other (−) inputs of the inverters 6*m* and 6*s* are connected to one contact 30*a* of a switch 30, which is adapted to be turned on and off. The other contact 30*b* of the switch 30 is connected to the other (+) inputs of the inverters 8*m* and 8*s*. The (+) inputs of the inverters 6*m* and 6*s* are connected also to one contact 32*a* of a switch 32, which is turned on and off. The switch 32 has its other contact 32*b* connected to the (+) inputs of the inverters 8*m* and 8*s*. The (−) inputs of the inverters 6*m* and 6*s* are connected to one contact 34*a* of a switch 34, which is turned on and off. The other contact 34*b* of the switch 34 is connected to the (−) inputs of the inverters 8*m* and 8*s*.

The contacts 30*a* and 30*b* of the switch 30 are either connected to each other and placed in an ON state or disconnected and placed in an OFF state by a contact shoe 30*c*. The switches 32 and 34 are similarly placed in either ON or OFF state by the action of contact shoes 32*c* and 34*c*, respectively.

The contact shoes 30*c*, 32*c* and 34*c* are controlled by switch control means, e.g. a switch control unit 36. The switch control unit 36 controls the contact shoes 30*c*, 32*c* and 34*c* in accordance with the voltage from the commercial AC power supply 16 as detected by voltage detecting means, e.g. a voltage detecting unit 38. More specifically, when voltage detecting unit 38 detects the output voltage of 100 V from the commercial AC power supply 16, the switch control unit 36 switches on the switches 32 and 34 and switches off the switch 30. This causes the inverters 6*m* and 8*m* to be connected in parallel and causes inverters 6*s* and 8*s* to be connected also in parallel. When the voltage detecting unit 38 detects the output voltage of 200 V from the commercial AC power supply 16, the switch control unit 36 turns off the switches 32 and 34 and turns on the switch 30. This causes the inverters 6*m* and 8*m* to be connected in series and also causes the inverters 6*s* and 8*s* to be connected in series. It should be noted that the voltage detecting unit 38 may be arranged to detect the output voltage of the rectifying circuit 18 instead of the output voltage of the commercial AC power supply 16. In FIG. 2, the power supply apparatus is shown including only the commercial AC power supply 16, the rectifying circuit 18, the inverters 6*m*, 6*s*, 8*m*, 8*s*, the switches 30, 32, 34, the switch control unit 36, and the voltage detecting unit 38, but the remaining portion (not shown) has the same arrangement as shown in FIG. 1.

In the described embodiment, the commercial AC power supply 16 has been described to provide either one of 100 V and 200 V output voltages. Other commercial AC power supplies, e.g. a commercial AC power supply providing two output voltages one of which has a magnitude, e.g. 400 V, twice that, e.g. 200 V, of the other output voltage, may be used. The single changeover switch 20 is used for the main unit 2 and the subsidiary unit 4 in common in the arrangement shown in FIG. 1, but separate changeover switches can be used for the main unit 2 and the subsidiary unit 4, respectively. The present invention has been described to be used in a power supply apparatus for a plasma welding machine or a plasma cutting machine, but may be embodied in power supply apparatuses having the same circuit arrangement for use for other purposes.

The invention claimed is:

1. A power supply apparatus comprising:
   a main unit including two main unit inverters, a main unit control circuit for controlling said two main unit inverters, and two main unit rectifying circuits, said two main unit rectifying circuits having their inputs connected to outputs of respective ones of said two main unit inverters and having their outputs connected together;

a subsidiary unit including two subsidiary unit inverters, a subsidiary unit control circuit for controlling said two subsidiary unit inverters, and two subsidiary unit rectifying circuits, said two subsidiary unit rectifying circuits having their inputs connected to outputs of respective ones of said two subsidiary unit inverters and having their outputs connected together;

a changeover switch for respectively connecting inputs of said two main unit inverters and inputs of said subsidiary unit inverters in a selected one of series and parallel connections; and an imbalance detecting circuit having its input connected to the input of said two main unit inverters and having its output connected to said main unit control circuit and to said subsidiary unit control circuit, for detecting imbalance in input voltage between said two main unit inverters when said two main unit inverters and said two subsidiary unit inverters are respectively connected in series and providing a result of said detection of imbalance to said main unit control circuit and to said subsidiary unit control circuit;

input current flowing into said main unit being larger than input current flowing into said subsidiary unit;

said main unit control circuit controlling, in accordance with the result of said detection of imbalance, said two main unit inverters to remove imbalance between said two main unit inverters;

said subsidiary unit control circuit controlling, in accordance with the result of said detection of imbalance, said two subsidiary unit inverters to remove imbalance between said two subsidiary unit inverters.

2. The power supply apparatus according to claim 1, wherein said changeover switch is shared by said main and subsidiary units.

3. The power supply apparatus according to claim 2, wherein said changeover switch is manually operated.

4. The power supply apparatus according to claim 2, wherein said changeover switch is automatically operated.

5. The power supply apparatus according to claim 1, wherein said input current flowing into said main unit is five or more times as large as the input current flowing into said subsidiary unit.

* * * * *